Feb. 12, 1946.  R. J. MILLER  2,394,867
MOTION PICTURE PROJECTOR
Original Filed Jan. 11, 1939    2 Sheets-Sheet 2
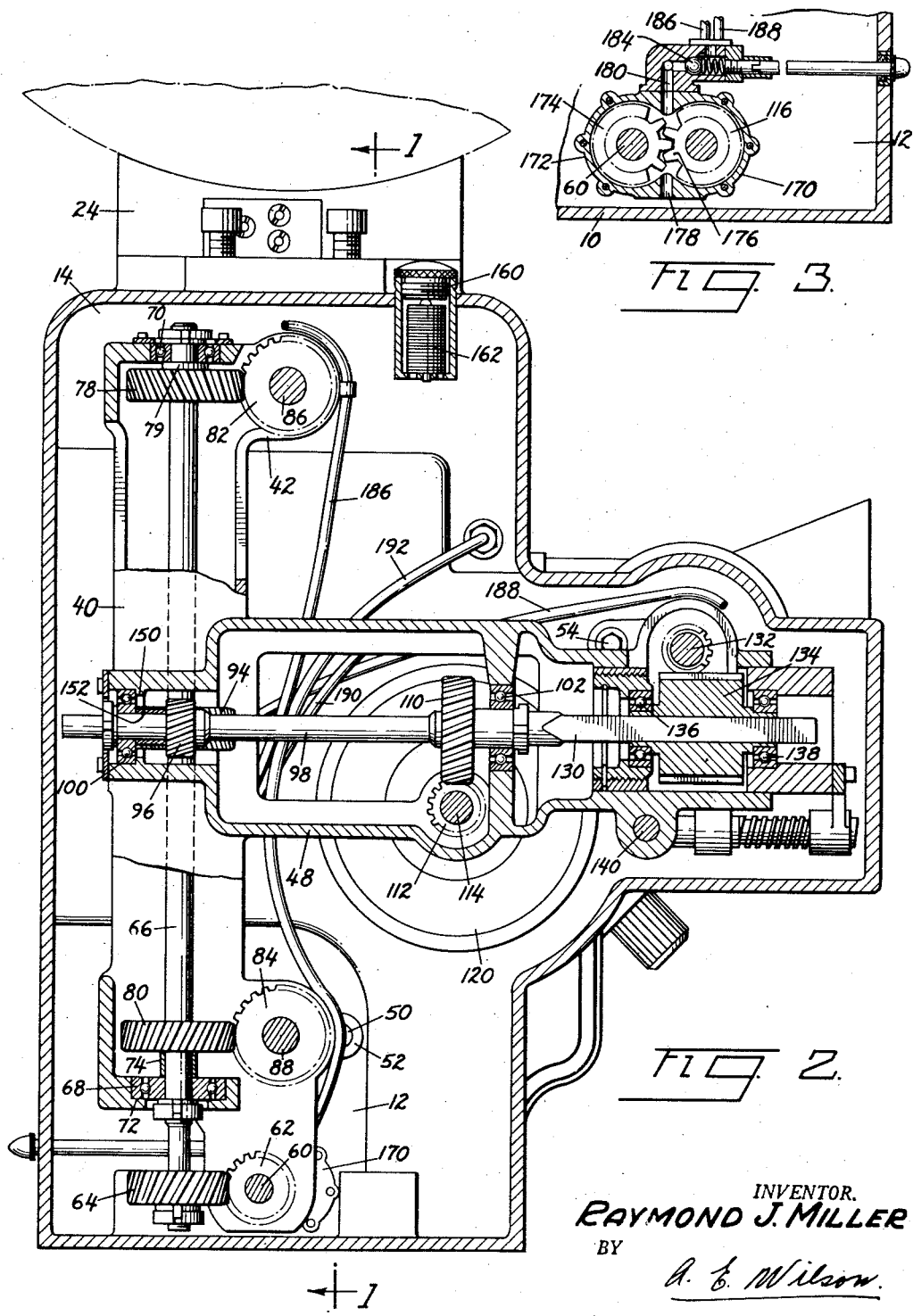
INVENTOR.
RAYMOND J. MILLER
BY
A. E. Wilson.
ATTORNEY Patented Feb. 12, 1946

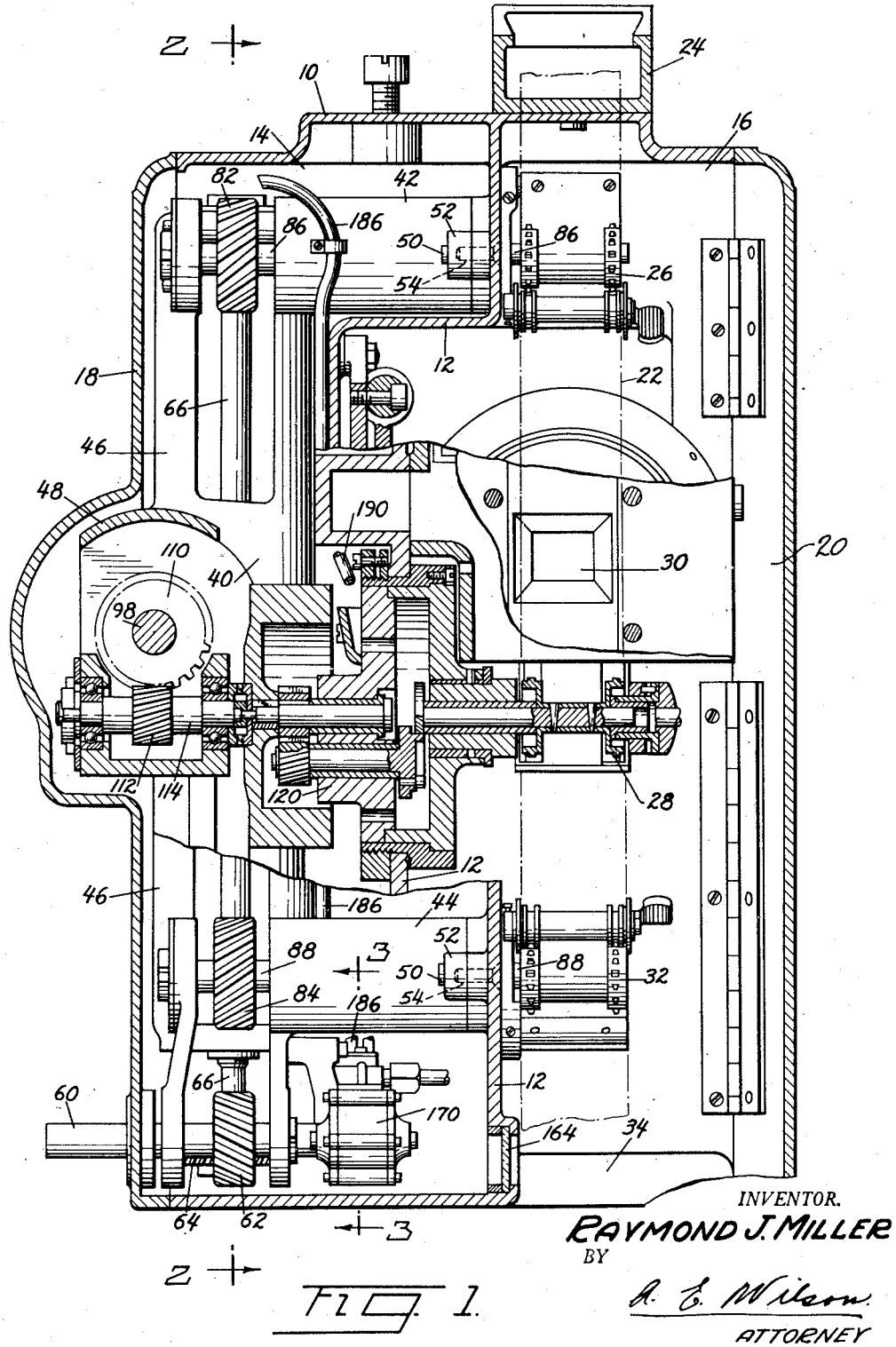

2,394,867

UNITED STATES PATENT OFFICE 2,394,867

MOTION PICTURE PROJECTOR

Raymond J. Miller, Detroit, Mich., assignor to American Pattern and Manufacturing Co., Detroit, Mich., a co-partnership Original application January 11, 1939, Serial No. 250,310, now Patent No. 2,312,663, dated March 2, 1943. Divided and this application June 16, 1942, Serial No. 447,252

2 Claims. (Cl. 88—17)

This invention relates to motion picture projectors and more particularly to an improved projector having unitary driving means for moving strip film through the projector to intermittently align successively spaced film frames with an aperture and to interrupt the projecting light as the film frames are moved.

Heretofore the driving means for moving the film and actuating the shutter of motion picture projectors has been formed of a plurality of separate but interconnected casings enclosing the driving shafts, gears, etc. of the projector. Considerable difficulty has been experienced in providing as rigid a mounting as is desirable particularly since the film must be moved to align approximately 1440 separate film frames with the aperture per minute and spaced film driving sprockets positioned on opposite sides of the intermittently driven member must be operated at approximately 360 R. P. M.

The shutter to interrupt the flow of projecting light must be actuated to interrupt the light at least once each time a different film frame is aligned with the aperture and preferably twice, to interrupt the projecting light while the film frame is maintained in alignment with the aperture to prevent visible flicker. The inertia built up by movement of the various parts, particularly the intermittent movement, causes rather severe vibrations which necessitate the provision of a relatively heavy projector mechanism. The size of the unit and the cost of manufacturing it are thus undesirably increased. Difficult service problems are encountered in projectors heretofore used since in order to replace a portion of the film moving or shutter driving mechanism it is necessary to virtually dismantle the entire projector to effect the necessary repairs.

An object of this invention is therefore to provide a motion picture projector having unitary means for directing the film through the projector and for actuating the shutter.

Another object is to provide a readily removable unitary gear train assembly having all the necessary interconnected gears and shafts required to actuate the film moving and shutter driving mechanisms.

A further object resides in the provision of an integral gear train carrier adapted to be readily mounted in a projector housing and having the necessary interconnected gears and shafts to actuate the film moving and shutter operating mechanisms so proportioned that the inertia and vibration resulting from rotation of the movable elements is minimized.

A further object is to provide a motion picture projector having a housing separated into mechanism and film compartments wherein an integral driving unit may be removably positioned in the mechanism compartment to provide all the necessary mechanism for actuating the movable parts of a projector.

Another object of the invention is to provide a projector having a closed mechanism compartment housing all the movable elements required in the operation of the projector and wherein means actuated by movement of the interconnected gears and shafts are provided to thoroughly lubricate all the moving parts in the mechanism compartment.

Yet a still further object resides in the provision of a motion picture projector having a one-piece casing divided by an integral wall into spaced film and mechanism compartments and wherein a removable gear train carrier may be detachably connected to the casing and located therein by suitable cooperating locating means interposed between the projector housing and the gear train carrier.

Still another object is to provide a motion picture projector having an integral gear train carrier wherein a minimum of different sizes of interchangeable gears are provided to drive the various film moving and shutter operating mechanisms of the projector.

Another object is to provide a motion picture projector having a housing provided with an intermediate wall adapted to receive a unitary gear train carrier housing and an intermittence mechanism housing operably connected through the gears of the gear train carrier to intermittently align successively spaced film frames with an aperture in a film compartment positioned on the opposite side of the intermediate wall.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings wherein similar reference characters refer to similar parts throughout the several views:

Fig. 1 is a staggered vertical sectional view of a motion picture projector illustrating the present invention taken substantially on the line 1—1 of Fig. 2 looking in the direction of the arrows.

Fig. 2 is a sectional view taken substantially on the line 2—2 of Fig. 1, looking in the direction of the arrows.

Fig. 3 is a sectional view taken substantially on the line 3—3 of Fig. 1, looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now to the drawings, it will be observed that a motion picture projector having a main housing 10 is provided with an intermediate wall 12. The wall 12 is preferably formed integrally with the housing 10 to separate the space within the housing into mechanism and film compartments 14 and 16 respectively. The mechanism compartment may be closed by a plate 18 suitably fastened thereto in such a manner as to provide a substantially fluid tight joint, and the film compartment 16 may be closed by a hinged access door 20 to permit the operator access to the film moving mechanism positioned in the film compartment.

Film 22 may be withdrawn from an upper magazine mounted on the top of the housing 10 and spaced therefrom by a film magazine adapter 24 and directed into the film compartment 16 by an upper driving sprocket 26. The film passes from the driving sprocket 26 between suitable film guiding mechanism, and successively spaced film frames are aligned with an aperture 30 in an aperture plate by an intermittently driven sprocket 28.

After passing beyond the intermittently driven sprocket 28 the film is directed over a lower drive sprocket 32 and is directed through an aperture 34 in the bottom of the film compartment 16 preferably to a sound head positioned to receive film from the projector.

The upper and lower film driving sprockets 26 and 32 are preferably driven at a constant rate of 360 R. P. M. and the intermittently driven sprocket 28 is preferably intermittently driven to align 1440 successively spaced film frames per minute with the aperture 30. This rapid intermittent starting and stopping of the sprocket 28 and its associated driving means builds up considerable inertia which causes undesirable vibration and subjects the driving mechanism to rather severe loads. A shutter is provided to interrupt the flow of projecting light each time the intermittently driven sprocket 28 is actuated. The shutter is preferably provided with an anti-flicker blade to interrupt the projecting light while a film frame is aligned with the aperture 30 to prevent visible flicker.

The upper and lower film driving sprockets 26 and 32 and the intermittently driven sprocket 28 and the shutter driving mechanism are preferably actuated by a unitary driving mechanism positioned in the mechanism compartment 14. A gear train carrier 40 having upper and lower shaft receiving portions 42 and 44 interconnected by a vertical shaft receiving portion 46 is also provided with an angularly related laterally extending shaft receiving portion 48. The shaft receiving portions 42, 44, 46 and 48 may preferably be formed as an integral casting to provide a more rigid structure capable of damping vibrations and oscillations and to provide a more rigid driving mechanism.

Locating means may be provided between the gear train carrier 40 and the projector housing 10. One desirable form of such locating means comprises dowel pins 50 preferably carried by the intermediate wall 12 and adapted to project into apertures formed in bosses 52 carried by the upper and lower portions 42 and 44 of the carrier 40. The gear train carrier 40 may be suitably fastened to the housing 10 as by screw threaded members 54 extending through the intermediate walls 12 and projecting into the upper and lower shaft receiving portions 42 and 44.

A main driving shaft 60 is journalled in the vertically extending shaft receiving portion 46 and is provided with a gear 62 meshing with a gear 64 fixed to a shaft 66 journalled in the vertical shaft receiving portion 46 on bearings 68 and 70. It will be noted that a flange 72 formed in the shaft receiving portion 46 is provided to form a seat for the bearing 68 and that the shaft 66 is provided with a sleeve 74 interposed between the bearing 68 and the gear 80 to position the shaft 66 in a predetermined vertical position in one direction within the vertical column 46. A sleeve 79 interposed between the bearing 70 and the gear 78 may be provided to maintain the shaft 66 in a predetermined position within the column 46 in the other direction.

The shaft 66 is provided with upper and lower driving gears 78 and 80 meshing with gears 82 and 84. The gears 82 and 84 are fixed to shafts 86 and 88 respectively journalled in the upper and lower shaft receiving portions 42 and 44 respectively. The shafts 86 and 88 project through oil seals positioned in the intermediate wall 12 and drive the upper and lower film driving sprockets 26 and 32 respectively.

The vertical shaft 66 is provided with a gear 94 meshing with a gear 96 fixed to a shaft 98 journalled in the angularly related shaft receiving portion 48 of the gear train carrier 40. The shaft 98 is journalled in bearings 100 and 102 respectively positioned in the portion 48. The shaft 98 is provided with a gear 110 meshing with a gear 112 fixed to a shaft 114. The shaft 114 is operably connected to drive the intermittently driven sprocket 28 through an intermittence movement 120 journalled in the intermediate wall 12. The structure of the intermittence movement 120 is more clearly disclosed in my co-pending application Serial No. 447,344, filed June 17, 1942.

It will be noted that the gears 78, 80, 82, 84, 94 and 110 are of the same diameter and are therefore interchangeable. A minimum number of sizes of gears are thus employed to provide the principal drive of the projector.

The shutter driven by the shutter driving shaft 132 is for the purpose of interrupting the flow of projecting light through the aperture 30 at the time the intermittently driven sprocket 28 is moved to align the next successive film frame with the aperture 30 to prevent streaking. Shutters are normally provided with an auxiliary blade to interrupt the projecting light while a film frame is held in alignment with the aperture to prevent visible flicker or a single blade shutter may be driven at double speed to effect the same result.

Since a definite relation must be maintained between the operation of the intermittently driven sprocket 28 and the shutter driving means in order to prevent streaking and visible flicker, some form of motion compensating or framing means must be provided to maintain the shutter driving mechanism in synchronism with the intermittently driven sprocket.

The shaft 98 is provided with a squared portion 130 operably connected to a shutter driving shaft 132 through an axially movable gear 134 meshing with and driving the shutter operating gear fixed to the shaft 132. The gear 134 is journalled in suitable bearings 136 and 138 to facilitate movement along the squared portion 130 of the shaft 98 and is axially extended as illustrated to actuate the shutter driving sprocket 132 as the framing shaft 140 is rotated to vary the position of a film frame relative to the aperture 30. The framing shaft 140 may be operably connected to rotate the intermittence movement 120 to move the film relative to the aperture for framing purposes as more clearly disclosed in my co-pending application Serial No. 250,310, filed January 11, 1939, now Patent Number 2,312,663, issued March 2, 1943.

The shaft 98 may be maintained in predetermined alignment within the housing portion 48 of the carrier 40 by means of a stop member in the form of an alignment shoulder 150 formed in the portion 48 to engage the inner edge of the outer periphery of the bearing 100. The shaft 98 is preferably provided with a sleeve 152 to engage the inner portion of the bearing 100 to maintain the shaft 98 in a desired lateral position with reference to the other operating portions of the mechanism.

In view of the fact that the mechanism compartment 14 is a substantially sealed chamber, oil may be distributed therein to lubricate the gears, bearings, shafts, etc. required to drive the film moving and shutter operating mechanisms. Lubricating oil may be introduced through a filler plug 160 having a suitable filter 162 positioned adjacent the top of the projector housing 10. A sighting glass 164 may be positioned in the intermediate wall 12 adjacent the bottom of the mechanism compartment 14 whereby the operator may observe the level of the oil in the mechanism compartment and observe the circulation of the oil to determine that the pump is operating.

An oil pump 170 may be driven by the main driving shaft 60. Any suitable form of oil pump may be employed such for example as a gear pump illustrated in Fig. 3 having a casing 172 receiving matching gears 174 and 176 to withdraw oil from an inlet port 178 adjacent the bottom of the mechanism compartment 14 and direct it through a conduit 180 communicating by way of a check valve 184 with conduits 186 and 188. The conduit 186 communicates with several ducts directed to deliver oil wherever needed to lubricate the moving parts of the projector such as to the gears 78 and 82 positioned adjacent the top of the mechanism compartment and the conduit 188 is directed to deliver oil to the shutter driving gears. A conduit 190 is provided to supply oil to the intermittence sprocket driving mechanism.

A conduit 192 communicating with one of the conduits 186 or 188 is provided to supply oil under pressure to actuate a pressure operated hydraulic fire shutter aligned with the aperture 30 to maintain the fire shutter in the elevated or operative position when the oil pump 170 is operating to supply a predetermined pressure to the conduits. When the operation of the pump stops or decreases to a substantially predetermined point the manually controlled settable ball check valve interrupts the flow of oil through the conduit 192 whereupon a fire shutter is lowered across the aperture 30 to interrupt the flow of projecting light through the aperture 30.

Since the mechanism compartment 14 is substantially closed, a spray of oil may be provided therein to thoroughly lubricate all of the moving parts.

In operation the drives for the film driving sprockets, intermittently driven sprocket and shutter mechanisms are transmitted through the interconnected gears mounted in the unitary gear train carrier removably positioned in the mechanism compartment 14 of the motion picture projector. Since the gear train carrier is a unitary structure the casting may be positioned in a fixture and machined with greater accuracy than where a plurality of separate and independent units must be aligned to provide a carrier for the gears and shafts. Greater accuracy in alignment of shafts and gears is therefore assured and minimum cost in the manufacture may be maintained.

The gear train carrier being a unitary structure having all of the interconnected gears and shafts required to effect the drive of the film moving and shutter operating mechanisms, may be readily removed from the projector housing for service and repair.

To remove the gear train carrier all that is necessary is that the film driving sprockets 26 and 32 and the fastening means 54 be removed. The intermittence movement 120 being an integral unit remains in the intermediate wall 12 and the shutter driving shaft 132 remains journalled in the housing 10 of the projector.

Synchronizing means are provided to ensure proper alignment of the intermittence sprocket driving mechanism with the shutter operating mechanism when the gear train carrier is reassembled in the housing 10 of the projector. Any gear train carrier assembly can thus be assembled in any housing 10 because the parts are accurately aligned and duplication of the parts is easy in view of the improved design whereby uniformity of structure and dimensions are assured. Universal exchange of the carrier mechanism is thus possible whereby service and repair of the projector are facilitated because a gear train carrier can be removed from the main housing 10 for repair and either replaced by another similar gear train carrier or replaced after being repaired. The service time required for repair or replacement of damaged parts is thus materially reduced and the projector can be returned to service in a minimum time because the damaged or worn parts can be replaced by a repaired or reconditioned unit and the damaged parts may be repaired at leisure. A considerable saving is thus effected for exhibitors because rather than maintaining extra complete projector units it is sufficient to maintain extra unit assemblies which may be readily exchanged for damaged or worn units of a projector in such a manner that the projector may be returned to service in the minimum time.

This is a division of my co-pending application Serial No. 250,310, filed January 11, 1939, now Patent Number 2,312,663, issued March 2, 1943.

I claim:

1. In a motion picture projector adapted to project successively spaced independent visual images carried by consecutively spaced film frames, a housing including spaced film and mechanism compartments, a plurality of spaced film driving sprockets in the film compartment and a shutter to momentarily interrupt the projection of said images, the combination of an integral shaft and gear train carrier having vertically and horizontally extending shaft receiving columns in the mechanism compartment, guiding means including cooperating apertured bosses and dowel pins interposed between the carrier and housing to accurately align the carrier with the housing, fastening means to detachably connect the carrier to the housing, and shafts in the carrier operably connected to drive said sprockets and shutter.

2. In a motion picture projector adapted to project successively spaced independent visual images carried by consecutively spaced film frames, a housing, a plurality of spaced film driving sprockets in the housing and a shutter to momentarily interrupt the projection of said images, the combination of a gear train carrier having vertically and horizontally extending shaft receiving columns in the housing, guiding means including cooperating apertured bosses and dowel pins interposed between the carrier and housing to accurately align the carrier with the housing, fastening means to detachably connect the carrier to the housing, and gear connected shafts in the carrier to drive said sprockets and shutter.

RAYMOND J. MILLER.